United States Patent
Browne

(10) Patent No.: US 11,448,881 B2
(45) Date of Patent: Sep. 20, 2022

(54) HIGH RESOLUTION WIDE FIELD OF VIEW DIGITAL NIGHT VISION SYSTEM

(71) Applicant: Vision Products, LLC, Los Gatos, CA (US)

(72) Inventor: Michael P. Browne, San Mateo, CA (US)

(73) Assignee: Vision Products, LLC, Los Gatos, CA (US)

( * ) Notice: Subject to any disclaimer, the term of this patent is extended or adjusted under 35 U.S.C. 154(b) by 59 days.

(21) Appl. No.: 16/532,407

(22) Filed: Aug. 5, 2019

(65) Prior Publication Data
US 2020/0018958 A1 Jan. 16, 2020

Related U.S. Application Data

(63) Continuation of application No. 15/471,359, filed on Mar. 28, 2017, now Pat. No. 10,473,931, which is a (Continued)

(51) Int. Cl.
*G02B 27/00* (2006.01)
*G02B 27/01* (2006.01)
(Continued)

(52) U.S. Cl.
CPC ...... *G02B 27/017* (2013.01); *G02B 2027/011* (2013.01); *G02B 2027/014* (2013.01);
(Continued)

(58) Field of Classification Search
CPC ............ G02B 27/017; G02B 2027/011; G02B 2027/0123; G02B 2027/0138;
(Continued)

(56) References Cited

U.S. PATENT DOCUMENTS

| 3,410,629 A | 11/1968 | Carpenter et al. |
| 4,599,640 A | 7/1986 | Dischert |

(Continued)

FOREIGN PATENT DOCUMENTS

JP 2010-145674 A 7/2010

OTHER PUBLICATIONS https://web.archive.org/web/20100212033119/http://www.trexenterprises.com/Products%20and%20Services/Sensors/poap.html Feb. 10, 2012.*

(Continued)

*Primary Examiner* — Frank F Huang
(74) *Attorney, Agent, or Firm* — Fenwick & West LLP

(57) ABSTRACT

A wide field of view night vision system is described. The system comprises a head attachment apparatus configured to attach to a user's head and a night vision subsystem. The night vision subsystem comprises one or more night vision image sensors attached to the head attachment apparatus. Each sensor receives input light and produces a digital image of the input light. A processor processes the digital image(s) to produce a wide-field image. The wide-field image spans at least 60 degrees of a user's horizontal field of view. A display and eyepiece attached to the head attachment apparatus receives and displays the wide-field image. The eyepiece is positionable between the display and the user's eye to image the wide-field image into the user's eye.

19 Claims, 4 Drawing Sheets

Related U.S. Application Data continuation of application No. 12/950,116, filed on Nov. 19, 2010, now Pat. No. 9,618,746.

(51) Int. Cl.
*H04N 5/225* (2006.01)
*H04N 5/232* (2006.01)
*H04N 5/33* (2006.01)

(52) U.S. Cl.
CPC .............. *G02B 2027/0123* (2013.01); *G02B 2027/0138* (2013.01); *H04N 5/2258* (2013.01); *H04N 5/23238* (2013.01); *H04N 5/33* (2013.01)

(58) Field of Classification Search
CPC ........... G02B 2027/014; H04N 5/2258; H04N 5/23238; H04N 5/33
See application file for complete search history.

(56) References Cited

U.S. PATENT DOCUMENTS

| | | | |
|---|---|---|---|
| 4,698,857 A * | 10/1987 | Kastendieck | ......... G02B 5/003 |
| | | | 2/426 |
| 5,457,493 A | 10/1995 | Leddy et al. | |
| 5,473,365 A | 12/1995 | Okamura | |
| 5,572,343 A | 11/1996 | Okamura et al. | |
| 5,726,807 A | 3/1998 | Nakaoka et al. | |
| 6,075,644 A | 6/2000 | Filipovich | |
| 6,088,165 A | 7/2000 | Janeczko et al. | |
| 6,201,641 B1 | 3/2001 | Filipovich | |
| 6,407,724 B2 | 6/2002 | Waldern et al. | |
| 6,462,894 B1 | 10/2002 | Moody | |
| 6,560,029 B1 * | 5/2003 | Dobbie | ............... G02B 23/125 |
| | | | 2/6.1 |
| 6,653,989 B2 | 11/2003 | Nakanishi | |
| 6,757,008 B1 | 6/2004 | Smith | |
| 7,072,107 B2 | 7/2006 | Filipovich et al. | |
| 7,158,296 B1 | 1/2007 | Schwartz, II et al. | |
| 7,289,272 B2 | 10/2007 | Bowron et al. | |
| 7,307,793 B2 | 12/2007 | Ottney et al. | |
| 7,381,952 B2 | 6/2008 | Teich et al. | |
| 7,806,533 B2 | 10/2010 | Boute et al. | |
| 8,736,967 B1 | 5/2014 | Browne et al. | |
| 8,817,196 B2 | 8/2014 | De La Tocnaye et al. | |
| 9,615,067 B1 | 4/2017 | Foote et al. | |
| 2003/0129567 A1 | 7/2003 | Cabato et al. | |
| 2003/0231804 A1 * | 12/2003 | Bacarella | ............ H04N 5/2624 |
| | | | 382/284 |
| 2004/0227703 A1 | 11/2004 | Lamvik et al. | |
| 2005/0046702 A1 | 3/2005 | Katayama et al. | |
| 2006/0291849 A1 | 12/2006 | Shamir et al. | |
| 2007/0247517 A1 | 10/2007 | Zhang et al. | |
| 2008/0136923 A1 | 6/2008 | Inbar et al. | |
| 2008/0170119 A1 * | 7/2008 | McCann | ................ H04N 7/181 |
| | | | 348/113 |
| 2008/0309774 A1 | 12/2008 | Beng Goh et al. | |
| 2009/0051760 A1 | 2/2009 | Ottney | |
| 2009/0052049 A1 * | 2/2009 | Batchko | ................. B33Y 50/02 |
| | | | 359/666 |
| 2009/0251680 A1 * | 10/2009 | Farsaie | ................... G01S 17/89 |
| | | | 356/3 |
| 2010/0128135 A1 * | 5/2010 | Filipovich | .......... G02B 27/0172 |
| | | | 348/217.1 |
| 2012/0002064 A9 | 1/2012 | Filipovich et al. | |
| 2012/0081545 A1 | 4/2012 | Jin et al. | |
| 2012/0119978 A1 | 5/2012 | Border et al. | |
| 2012/0182326 A1 | 7/2012 | Moore | |
| 2012/0257005 A1 | 10/2012 | Browne | |
| 2013/0234935 A1 | 9/2013 | Griffith | |
| 2014/0247323 A1 | 9/2014 | Griffis et al. | |
| 2017/0237913 A1 | 8/2017 | Kiser et al. | |

OTHER PUBLICATIONS

United States Office Action, U.S. Appl. No. 15/605,741, dated Mar. 3, 2020, 13 pages.
United States Office Action, U.S. Appl. No. 15/605,741, dated Aug. 18, 2020, 15 pages.
Moore, S.A., "Anamorphic Eyepiece for Increased Field of View," International Optical Design Conference (IODC), Jun. 13, 2010, Jackson Hole, WY, 5 pages.
United States Office Action, U.S. Appl. No. 15/605,741, dated Jul. 10, 2019, 12 pages.
Wilburn, PhD thesis, "High Performance Imaging Using Arrays of Inexpensive Cameras", A Dissertation Submitted to the Department of Electrical Engineering and the Committee on Graduate Studies of Stanford University in Partial Fulfillment of the Requirements for the Degree of Doctor of Philosophy; 2004.

* cited by examiner

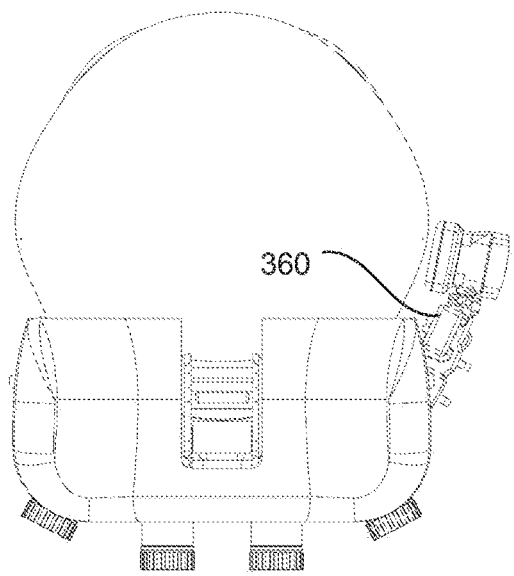
FIG. 4b
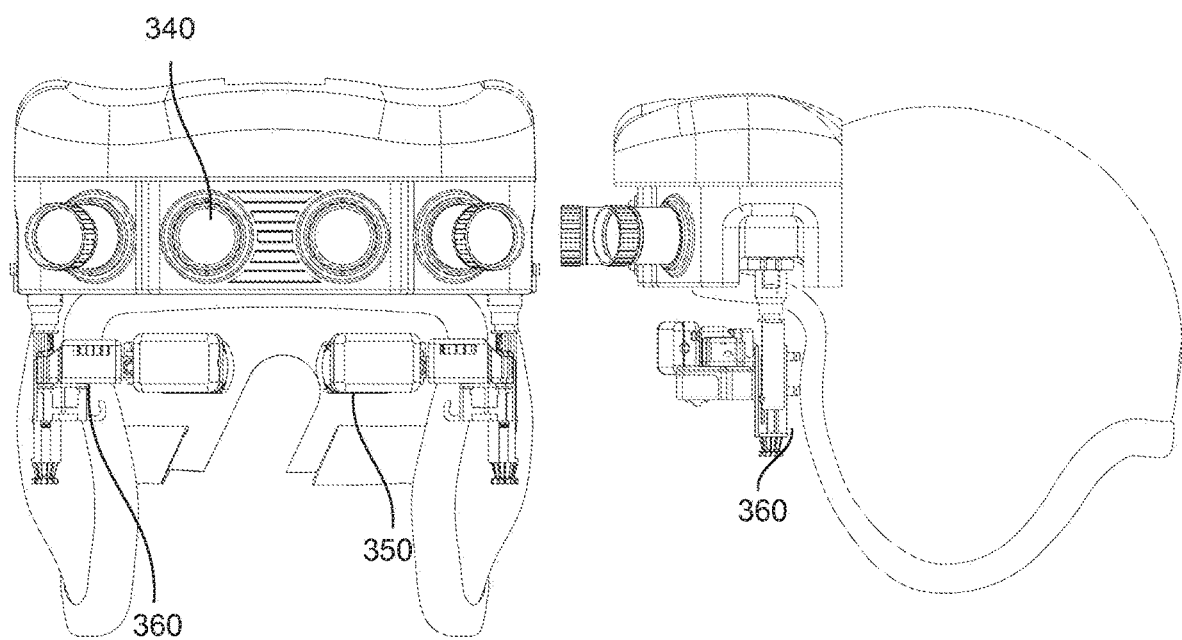
FIG. 4a
FIG. 4c

HIGH RESOLUTION WIDE FIELD OF VIEW DIGITAL NIGHT VISION SYSTEM

CROSS REFERENCE TO RELATED APPLICATIONS

This application is a continuation of prior, co-pending U.S. application Ser. No. 15/471,359, filed on Mar. 28, 2017, which is a continuation of U.S. application Ser. No. 12/950,116, (now U.S. Pat. No. 9,618,746) filed on Nov. 19, 2010, both of which are incorporated herein by reference in their entirety for all purposes.

GOVERNMENT RIGHTS LEGEND

This invention was made with government support under Phase I SBIR Government contract FA8650-08-M-6892 and Phase II SBIR Government contract FA8650-09-C-6018 awarded by the United States Air Force. The government has certain rights in the invention.

BACKGROUND

1. Field of Art

This invention generally relates to the field of night vision systems, particularly to head or helmet mounted night vision systems.

2. Description of the Related Art

A night vision system improves the ability of a user to see in an environment where small amounts of light are present. Existing night vision systems take in low levels of ambient light not viewable to the naked eye and amplify it to viewable levels using image intensifier tubes. An image intensifier tube functions by amplifying the number of received photons while keeping the resulting photons spatially separated so that the original image formed by the ambient light is not distorted or blurred. The downside of image intensifier tubes, however, is that they are bulky and they are analog sensors. Existing night vision systems have a number of limitations caused by the physical characteristics of image intensifier tubes.

For example, existing night vision systems have large forward projection and have forward centers of gravity, which reduces their usability. In particular, pilots using existing systems have a restricted range of motion for their head and the forward center of gravity induces neck fatigue and is unsafe for ejection. When performing high gravity turns, the weight of the night vision system is multiplied by the g-loading generated by the turn. That weight is borne by the pilot in the head and neck area. A non-neutral center of gravity serves to magnify the weight felt by the pilot while in the turn, which causes the night vision system to move and may result in injury to the pilot.

Existing night vision systems typically also have a limited field of view, often around 40 degrees in both the horizontal and vertical directions. Increasing the field of view typically would require the use of multiple image intensifier tubes. The additional image intensifier tubes multiply the engineering constraints (including weight, space and power) of the system, along with any problems caused by those constraints. Further, they can introduce distortion in the night vision image viewed by the user at the boundary between the outputs of adjacent tubes. There is currently no way to remove the distortion in these systems.

SUMMARY

The present invention overcomes the limitations of the prior art by providing a wide field of view digital night vision system. The night vision system uses digital sensors in place of image intensifier tubes. The digital sensors output electronic images rather than amplified light, thereby reducing the engineering constraints of the system and allowing for features not present in existing night vision systems.

In one embodiment, the night vision system includes a head attachment apparatus configured to attach to a user's head, and a night vision subsystem. The night vision subsystem comprises one or more night vision image sensors attached to the head attachment apparatus. Each sensor receives low intensity ambient input light comprising at least one band of wavelengths in the visible to near infrared range, and produces a digital image of the input light. A processor receives the digital image(s) from the digital night vision image sensor(s) in order to process the digital image(s) to produce a wide-field image. The wide-field image spans at least 60 degrees of the user's horizontal field of view. A display and eyepiece attached to the head attachment apparatus receives and displays the wide-field image. The image of the surroundings produced by the night vision system is located in the same position within the user's field of view as the actual surroundings. The eyepiece is positionable between the display and the user's eye to image the wide-field image into the user's eye.

In one embodiment, the head attachment apparatus comprises a helmet and an adjustable arm attached to the helmet. The adjustable arm holds the display and eyepiece. The adjustable arm is moveable to (a) a first position where the display and eyepiece are out of the user's line of sight so that the system does not significantly obstruct the user's vision, and (b) a second position where the display and eyepiece are in the user's line of sight so that the wide-field image is imaged into the user's eye.

In one embodiment, the night vision system comprises at least two night vision image sensors, each producing a digital image of the user's field of view. The night vision image sensors are positioned with respect to each other (e.g., horizontally offset and/or angled) such that the digital images are horizontally offset but with some overlap. The processor receives the digital images from the digital night vision image sensors and processes the digital images to produce the wide-field image.

In one embodiment, the night vision system comprises a second display and eyepiece attached to the head attachment apparatus. The processor processes the digital images to produce a left eye wide-field image and a right-eye wide field image, each wide-field image spanning at least 50 degrees of a user's horizontal field of view and the total system spanning at least 60 degrees, with each eyepiece/display independently positionable with respect to the user's right or left eye, to image the corresponding wide-field image into the user's eye.

Other aspects of the invention include devices and applications for the system described above, and methods corresponding to all of the foregoing.

BRIEF DESCRIPTION OF DRAWINGS

FIG. 4a is a front view of a high resolution wide field of view digital night vision system.

FIG. 4b is a top view of a high resolution wide field of view digital night vision system.

FIG. 4c is a side view of a high resolution wide field of view digital night vision system.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
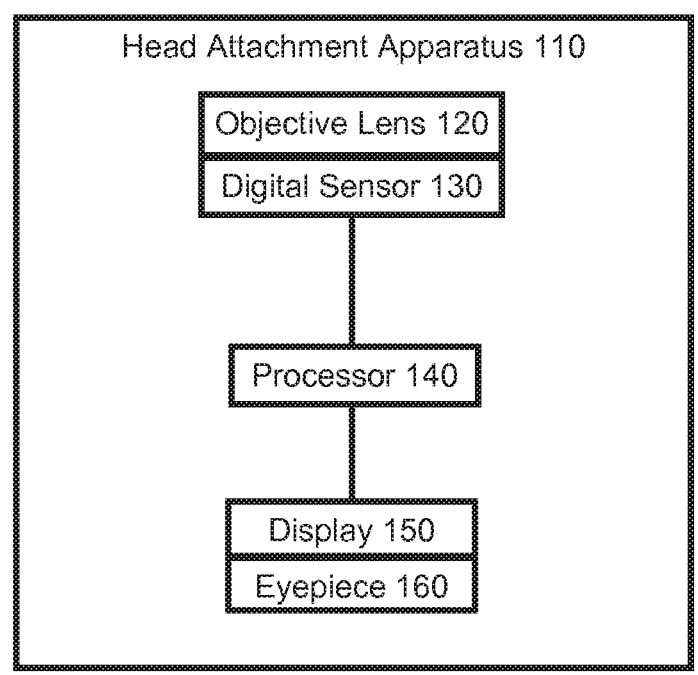
FIG. 1 is a system diagram of a high resolution wide field of view digital night vision system.

FIG. 1 is a system diagram of a night vision system. The night vision system 100 comprises a head attachment apparatus 110, an objective lens 120, a digital sensor 120, a processor 140, a display 150, and an eyepiece 160.

The night vision system 100 receives as input low intensity ambient light from the surroundings in the field of view of the night vision system 100 through the objective lens 120 into the digital sensor 130. The digital sensor 130 amplifies the low intensity ambient input light and outputs a digital image of the surroundings. The digital image is in an electrical format, and can be manipulated, stored, and transmitted by electronic devices such as the processor 140. The digital image is passed from the digital sensor 130 to the processor 140, which processes it to form a wide-field of view image. In one embodiment, there are multiple digital sensors 130 and the processor 140 stitches together the digital images from multiple digital sensors 130 to form a wide-field of view image, still in digital format. The processor 140 sends the resulting wide-field image to a display 150 which, via the eyepiece 160, images the wide-field image into the user's eyes. The eyepiece 160 may correct the aspect ratio of the wide-field image so that it appears at the same aspect ratio as the original surroundings. The image of the surroundings produced by the night vision system 100 is located in the same position within the user's field of view as the actual surroundings.

Depending upon the embodiment, the night vision system 100 may comprise more than one objective lens, digital sensor, processor, display, and/or eyepiece. Particularly, if the night vision system comprises at least two objective lenses, at least two digital sensors, two displays and two eyepieces, the night vision system is capable of providing depth perception to the user. Additionally, the number of digital sensors and objective lenses will affect the width of the field of view and resolution of the night vision system. All other things equal, the greater the number of objective lenses and digital sensors present, the wider the field of view and the higher the resolution of the night vision system.

The head attachment apparatus 110 keeps the night vision system 100 securely fastened to the user's head. Different embodiments of the night vision system may make use of different head attachment mechanisms, in order to suit the purposes of the user. For example, in one embodiment the head attachment apparatus 110 may comprise a helmet. In contrast, in other embodiments the head attachment apparatus 110 may be a banana clip mount, simple screw, or any other platform for affixing the head attachment apparatus 110 to something else that is attached to the user's head.

Objective lens 120 receives low intensity ambient input light from the environment in front of the night vision system, and focuses the incoming light to image it on the digital sensor 130. The objective lens may also serve to filter the wavelength of the incoming radiation for a number of purposes, including night vision lighting compatibility. The objective lens may be made of several different materials including, for example, glass or plastic.

The digital sensor 130 receives the input light from the objective lens 120. The input light is converted by the digital sensor 130 into a digital image. The digital sensor 130 stores a digital version of the original image using spatially separated units (pixels). Together, the pixels collectively spatially map the input light and the image formed by the input light into an electrical data format. In some embodiments, the pixel data additionally comprises wavelength information from the input light which, depending upon the embodiment, may be used to add color or false color to the digital image.

In some embodiments instead of using digital sensors, the night vision system 100 may comprise traditional image intensifier tubes (not shown) coupled to fiber optic couplers which would then be coupled to a traditional CCD designed to receive photons that are emitted from the image intensifier tube.

Using digital sensors in place of image intensifier tubes has several benefits. Image intensifier tubes are generally five to ten times longer than the digital sensors. In addition to the length of the image intensifier tube itself, additional space is taken up by the optical path from the output of the image intensifier tube to the eyepiece in front of the user. The space requirements for these tubes is multiplied if high resolution or wide field of view functionality is desired.

In contrast to image intensifier tubes, digital sensors output an electronic digital image rather than an optical analog image. The digital image is converted back to light when it is ready to be displayed to the user. As a result, space that would otherwise be taken up by the image intensifier tube output optical path can be can be replaced by wires or digital circuits, which are significantly smaller. In some applications, this saves about three quarters of an inch of optical path space per digital sensor. It also simplifies the placement of the digital sensors, as there is no longer a requirement of an uninterrupted optical path having the diameter of the image intensifier tube and running from intensifier tube output to the eyepiece in front of the user. As a result, a night vision system that has a reduced forward projection and has an ejection safe weight and center of gravity may be constructed.

Digital sensors 130 may be constructed using several different technologies. In one embodiment, each digital sensor 130 is comprised of a photocathode, air gap, a high voltage source, and a charge coupled device (CCD) specially designed to receive accelerated electrons rather than photons. Photons are received at the front of the digital sensor by the photocathode, where they are converted to electrons. The electrons are accelerated through the air gap by the high voltage source. At the end of the air gap, the accelerated electrons slam into a charge coupled device well. As a result of the acceleration of the electrons impinging upon the CCD well, the CCD well produces more electrons than are received, wherein the number of extra electrons that is generated in the well is based on the velocity of the received electrons. The velocity of the received electrons is determined based on the voltage of the high voltage source, and is referred as the gain factor of the night vision system. The CCD well has a pixel resolution, so that the image formed by the received photons is imaged in the form of electrons inside the pixels of the CCD well. The electrons in the CCD well are then converted to a digital signal through an analog to digital converter. In one embodiment, the digital sensor 130 is an INTEVAC or FAIRCHILD digital sensor. In one embodiment, a digital sensor 130 receives input at a pixel resolution of 1600×1200, which corresponds to a 40×30 degree field of view for the given objective lens.

Night vision systems 100 are configured to operate within a specified range of wavelengths. Generally, this range of wavelengths ranges from the visible wavelengths to the near infrared wavelengths, or generally from approximately 390 nanometers (nm) to 1100 nm.

Night vision systems are generally most useful in circumstances where there the ambient light intensity is very low. As both digital sensors 130 and image intensifier tubes are designed to amplify the intensity of received ambient light, they generally do not function as well (and are not needed) in circumstances where there is a lot of ambient light. Low intensity ambient light conditions include a range of conditions, from when there is almost no ambient light up to and including full moon conditions. Night vision systems operate at low light levels, but that does not necessarily preclude their operation at higher light levels. In one embodiment, the lowest level of ambient light necessary for the night vision system to function is approximately $10^{-4}$ lux.

Each digital sensor 130 captures light within the field of view of the objective lens 120. By adjusting the design of the objective lens 120, the field of view (specifically, the angular resolution in the object space) may be adjusted. As described above, each digital sensor 130 only has a finite number of pixels into which it can capture received input light. As the field of view increases, the volume of light that will be captured by each pixel increases, reducing the ability of each pixel to capture fine details. In other words, as the field of view increases, the resolution of each pixel goes down.

In one embodiment, each objective lens 120 and digital sensor 130 combination captures a 27.5 degree horizontal view and a 30 degree vertical field of view. In other embodiments, the system may be configured so that each objective lens and digital sensor combination captures a 40 degree or greater horizontal and/or vertical field of view. The system may also be configured to captured a narrower field of view than the embodiments previously described.

By incorporating more than one digital sensor 130, a night vision system 100 can capture a wide field of view and simultaneously maintain a high resolution. The processor 140 (or microprocessor) is configured to stitch together the digital images received from multiple digital sensors in order to produce a wide-field image. Digitally stitching together images from multiple digital sensors and displaying them on a single eyepiece optic results in reduced distortion and visual anomalies compared to approaches based on combining optical images.

In one embodiment, the processor 140 stitches together multiple digital images by detecting how the digital images overlap. The processor 140 can then use the overlap between digital images in order to determine where one image ends and another begins, in order to form a wide-field image with no overlap and no lost image data.

Figure 2:
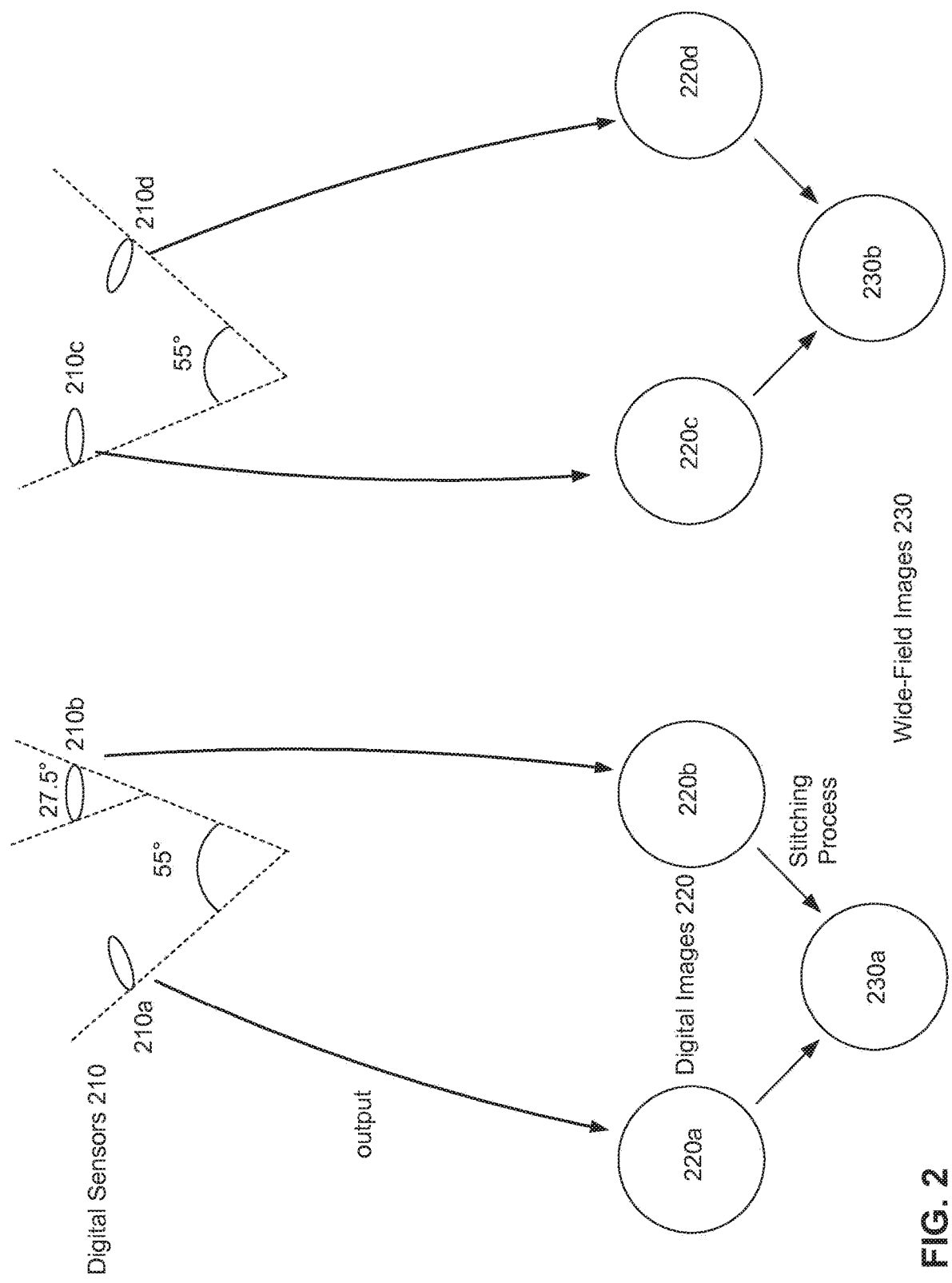
FIG. 2 illustrates a high resolution wide field of view night vision system comprising four digital sensors producing wide field of view images for the left and right eye.

FIG. 2 illustrates a high resolution wide field of view night vision system comprising four digital sensors 210a-d with output image data stitched together to provide a user with a wide field of view and depth perception. Each digital sensor 210a-d produces a corresponding digital image 220a-d. In the embodiment of FIG. 2, the night vision system 100 produces a wide-field image with an 80 degree horizontal field of view for the whole system. The four digital sensors 210 are divided into two pairs of two digital sensors each. Sensors 210a/b are the left eye pair and sensors 210c/d are the right eye pair. Within each pair of digital sensors, each digital sensor is angled away from the other and spatially offset from the other in order to increase the horizontal field of view in the captured images. Generally, at least some overlap between each digital sensor in a pair is desirable so that when the processor 140 stitches together the digital images from each digital sensor in the pair, it can create a contiguous wide-field image with no gaps. The two digital sensors on the left, 210a and 210b, provide the digital images 220a and 220b that will be stitched together to form the wide-field image 230a that will be displayed to the user's left eye. The two digital sensors on the right, 210c and 210d, provide the digital images 220c and 220d that will be stitched together to form the wide-field image 230b that will be displayed to the user's right eye.

In the example embodiment of FIG. 2, each digital sensor 210 captures a 27.5 degree field of view. Digital images 220a and 220b are stitched together to form a 55 degree field of view wide-field image. In this embodiment, the night vision system 100 has a total horizontal field of view of 82.5 degrees, with an overlap of 27.5 degrees between the two wide-field images.

In some embodiments, the processor 140 may additionally modify the wide-field image to include information that was not originally present in the input image. For example, the processor 140 may include overlaid symbology or video on top of the digital image. For example, the overlay could include text information, geo-location information, or video from a remote sensor or unmanned vehicle.

In one embodiment, the processor is attached to the head attachment apparatus 110 along with the remainder of the night vision system 100. In another embodiment, the processor is located external to the night vision system 100. For example, the processor could be part of the computer of a helicopter the user is flying with the aid of the night vision system 100 or it could be mounted in a small enclosure clipped to the user's clothing "chest pack". In one embodiment, the processor is connected to the night vision system through an input port configured to transmit data to and from the digital sensors 130 and the displays 150. Once the processor 140 has completed stitching and/or modifying the digital image to create the wide-field image, the wide-field image is passed to a display 150. The display 150 images the wide-field image into the eyes of the user of the night vision system 100. The wide-field image received by the display 150 has a pixel resolution defined by the pixel resolution of the digital sensors 130, for example 1600×1200 per digital sensor. The display 150 comprises enough pixels in order to accurately reproduce the digital image at a high resolution. In one embodiment, the display 150 has a high resolution if it has a pixel resolution of at least 3200×1200. Other pixel resolutions possible with this approach include 3840×1024, 2400×1024, 2880×1200, and 2560×1024.

Existing displays 150 are only able to reproduce approximately 1280×1024 pixels in a size that is convenient for a night vision system 100. Although display technology is expected to improve over time, thereby increasing the number of pixels in a display, it is possible to obtain the required number of pixels for a high resolution night vision system using existing display technology. Each pixel in a display 150 comprises three subpixels each of which displays a different color. Traditionally, the colors assigned to the subpixels are red, green, and blue. Each subpixel is capable of displaying its assigned color at a varying level of brightness. Changing the brightness of each subpixel changes the overall color for the pixel when the pixel is viewed at a distance. Frequently, the subpixels are vertically striped, meaning that they are three equal width vertical strips of color that three times as high as they are wide. Other subpixel layouts are possible, however.

In some embodiments, in order for the wide-field image output by the night vision system 100 to have sufficient resolution to be considered high resolution, each subpixel of the display 150 is coded as a separate pixel. Thus, each subpixel of the display is separately coded to correspond with a pixel of the digital image. In one embodiment, if the display 150 comprises 1280×1024 pixels and the subpixels are vertical striped as described above, adding subpixel coding to control each subpixel of the display as a separate pixel will result in a display resolution of 3840×1024 pixels, which is sufficient for high resolution over a wide field of view.

In the future, as the pixel count of available display technology increases, subpixel coding may become less necessary. In this case, the subpixels may again be used for their normal function, for example outputting a wide-field image of different colors. For example, if the display 150 had approximately 1920 horizontal pixels and was vertically striped as described above, subpixel coding could be used to encode every odd pixel as a first color, and every even pixel as a second color. In this embodiment, every two subpixels would represent a single pixel in the digital image. Thus, with subpixel coding the display 150 would effectively have approximately 2880 horizontal pixels, which is sufficient for high resolution, and the ability to display any combination of these two colors in the wide-field image.

The display 150 may be constructed using any technology capable of displaying a sufficient number of pixels or subpixels to produce a high resolution, wide field of view image. Examples of display technology that may be used include liquid crystal displays (LCD), liquid crystal on silicon (LCOS) displays, plasma displays, light emitting diode (LED) displays, or organic light emitting diode (OLED) displays.

The output wide-field image of the display 150 passes through an eyepiece 160 before reaching the user's eye. In embodiments making use of subpixel coding, the eyepiece 160 comprises an anamorphic eyepiece in order to correct the aspect ratio of the output wide-field image. An anamorphic eyepiece comprises lens elements that produces a different effect on light passing through the eyepiece in the horizontal and vertical directions. For example, if the display 150 is a vertically striped display such that the subpixels are three times taller than then they are wide as described above, the eyepiece 160 is anamorphic in such a manner as to reverse the change in the aspect ratio caused by the subpixel aspect ratio. The output wide-field image passing through the anamorphic eyepiece 160 will be stretched in the horizontal direction and/or shrunk vertical direction such that the wide-field image as imaged on the user's eye matches the aspect ratio of the input light. The eyepiece 160 may be additionally configured to focus the wide-field image onto the user's eye. For details on an example anamorphic eyepiece, see U.S. Pat. No. 8,736,967 entitled "Anamorphic Eyepiece", which is incorporated herein by reference.

Figure 3:
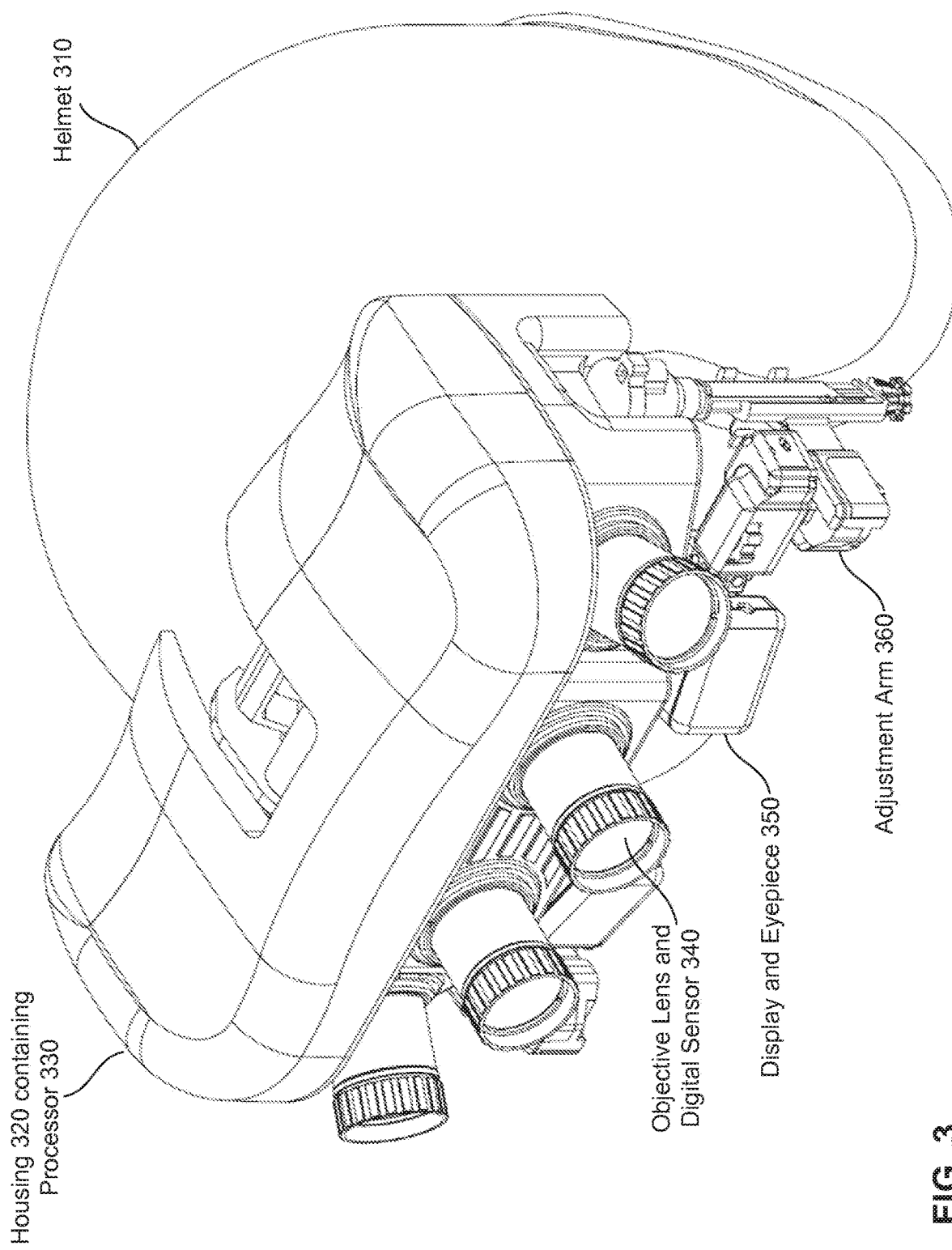
FIG. 3 is a perspective view of a high resolution wide field of view digital night vision system.

FIG. 3 is a perspective view of a high resolution wide field of view digital night vision system. In the example of FIG. 3, the night vision system 100 is attached to a helmet 310. The example embodiment of FIGS. 3 and 4 is designed for use by pilots, in that it minimizes the forward projection of the system, has a neutral center of gravity, is ejection safe, allows the user increased visibility of the field of view around the night vision field of view, and allows the user to selectively retract one or both night vision displays 350 to increase the non-night vision field of view.

The night vision system 100 may be attached to the helmet 310 using an attachment interface. One example of an attachment interface is a banana clip mount. The processor 330 of the night vision system 100 is protected by a housing 320. The objective lenses and digital sensors 340 are spaced apart and angled away from each other in manner similar to the example embodiment of FIG. 2. The objective lenses and digital sensors 340 and are located above the user's eye line on the forehead portion of the helmet 310. In this embodiment, four digital sensors 340 create a high resolution, wide field of view night vision image that is projected towards the user's eyes through two displays and eyepieces 350. The displays and eyepieces 350 are located at the ends of two separate adjustment arms 360. The adjustment arms 360 can be separately adjusted by the user to move a display and eyepiece 350 away from the user's eye to increase the user's non-night vision field of view.

The night vision system may also be used in applications that are not helmet mounted. Weapons sights, sights for non-weapons, electronic binoculars and telescopes (i.e., those which capture an image and then redisplay it), viewfinders for camcorders or other devices, and personal display systems (i.e., a device that projects images directly into the user's eye) are some examples.

Generally, in a night vision system 100 there will be a small amount of vertical displacement between the location of the digital sensors 340 and the location of the user's eyes. It is desirable to minimize the vertical displacement by placing the objective lens and digital sensor 340 as close, vertically, to the user's eyes as possible without obscuring the user's field of view. Generally, a small amount of vertical displacement will not affect the user when using the night vision system.

During use, the displays and eyepieces 350 are located a small distance from user's eyes. When both displays 350 are positioned in front of the user's eyes, the user has a night vision field of view of 80 degrees total through both eyes. Each adjustment arm 360 and the attached display and eyepiece 350 can be separately stowed by the user. By stowing a single adjustment arm, a user may continue to gain the benefit of night vision in one eye, while increasing their non-night vision field of view in the other. This may be useful, for example, when conducting airplane or helicopter night landings, where some night vision is desirable, but high levels of lighting in the surrounding environment make a normal vision field of view desirable as well. The adjustment arm may be stowed or moved into position by any number of mechanical devices. The adjustment arm may extend and collapse and rotate or pivot around one or more axes, or bend depending upon the embodiment.

FIG. 4a is a front view of a high resolution wide field of view digital night vision system. In the example of FIG. 4a, the adjustment arms 360 are deployed for use. The displays and eyepieces 350 are located very close to the digital sensors 340 in order to minimize the vertical displacement between the user's line of sight and the night vision image presented to the user. Additionally, the objective lenses and digital sensors 340 are horizontally aligned with the user's line of sight.

FIG. 4b is a top view of a high resolution wide field of view digital night vision system. In the example of FIG. 4b, one of the two adjustment arms 360 has been stowed to the side of the helmet 310. The other adjustment arm 360 is not visible, as it is deployed and therefore obscured by the housing 320 and the remainder of the night vision system 100.

The top view of the high resolution wide field of view digital night vision system illustrates the forward projection of the night vision system. For any head mounted system, night vision or otherwise, forward projection is the distance from the center of the user's head to the furthest outcropping of any portion of the head mounted system. When rotated through the angle that the user's head can turn, this forward projection is sometimes referred to as swept volume. In one embodiment, the night vision system 100 has a forward projection of 8.2 inches regardless of whether the adjustment arms are deployed or stowed. In another embodiment, the system has a forward projection of 8.5 inches. Traditional night vision systems can have a forward projection of 9.9 inches or greater. By keeping the weight low and reducing the forward projection, a night vision system, such as the example in FIG. 4b, may be constructed to have an ejection safe center of gravity.

FIG. 4c is a side view of a high resolution wide field of view digital night vision system. In the example of FIG. 4c, the adjustment arms 360 are deployed for use.

Table 1 below describes additional feature information related to several example embodiments of the night vision system 100. These are merely examples, however, and thus the system may vary from the examples below.

TABLE 1

HRVNS Feature Information

| Feature | Example Embodiment 1 | Example Embodiment 2 | Example Embodiment 3 |
|---|---|---|---|
| Field of View | 82.5 × 30 deg | 80 × 30 deg | 90 × 40 deg |
| Overlap | 27.5 deg | 30 deg | 30 deg |
| On-axis Exit Pupil Diameter | 12 mm | 12 mm | 15 mm |
| Off-axis Exit Pupil Diameter | 7 mm | 7 mm | 12 mm |
| Eye Relief | 25 mm | 25 mm | 30 mm |
| Weight (w/mount) | <5# head supported weight (HSW) | <5# head supported weight (HSW) | <4.5# head supported weight (HSW) |
| Interpupillary Distance Range | 52-80 mm | 57-71 mm | 55-75 mm |
| Fore/Aft Adjustment Range | 36 mm | 30 mm | 36 mm |
| Vertical Adjustment Range | 35 mm | 16 mm | 35 mm |
| Eyepiece Focus | −0.75 D | −0.75 D | −0.75 D |
| System Resolution/ Modulation Transfer Function (Quarter Moon) | 1.15 cy/mr on axis (20/30 Snellen) | 1.15 cy/mr on axis (20/30 Snellen) | 1.3 cy/mr on axis (20/26 Snellen) |
| Center of Gravity | Ejection Safe | Ejection Safe | Ejection Safe |
| Halo Diameter | 0.7 mm | 0.7 mm | 0.0 mm |
| Distortion | <3.0% | <3.0% | <1.0% |
| Battery Power | A/C Powered | 10 hours primary and secondary | 12 hours primary and secondary |
| Objective Focus Range | 36" to infinity | 36% to infinity | 12" to infinity |
| Filtering | Unfiltered, with attachable filters | Unfiltered, with attachable filters | Unfiltered, with attachable filters |

Terms such as "optical" or "light" are not intended to be limited to any one specific wavelength range. Nor are they meant to be limited to the visible region of the electromagnetic spectrum.

Some embodiments may be described using the expression "coupled" or "connected." It should be understood that these terms are not intended as synonyms for each other. The term "connected" indicates that the connected elements are in direct physical, electrical, or optical contact with each other. The term "coupled" includes the case where the coupled elements are in direct physical, optical, or electrical contact but it also includes the case where the coupled elements are not in direct contact with each other, but still co-operate or interact with each other. In particular, there may be intervening elements.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A night vision system comprising:
a first objective lens and a first digital night vision sensor that is not an image intensifier tube, the first objective lens imaging light from an environment onto the first digital night vision sensor, the first digital night vision sensor capturing said light imaged by the first objective lens and producing a first digital image of the light captured by the first digital night vision sensor;
a second objective lens and a second digital night vision sensor that is not an image intensifier tube, the second objective lens imaging light from the environment onto the second digital night vision sensor, the second digital night vision sensor capturing said light imaged by the second objective lens and producing a second digital image of the light captured by the second digital night vision sensor, wherein the first digital image and the second digital image are horizontally partially overlapping;

a processor that electronically receives the first and second digital images from the digital night vision sensors that are not image intensifier tubes and stitches the digital images together to form a wide-field digital image having at least a 55 degree horizontal field of view, wherein to stitch the digital images together the processor (1) detects the horizontal overlap of the first and second digital images and (2) stitches the digital images together based on the detected overlap to form the wide-field digital image; and a display and an eyepiece, the display receiving the wide-field digital image from the processor and displaying the wide-field digital image, the eyepiece imaging the wide-field digital image into an eye of a user.

2. The night vision system of claim 1, further comprising:
a third objective lens and a third digital night vision sensor, the third objective lens imaging light from the environment onto the third digital night vision sensor, the third digital night vision sensor capturing said light imaged by the third objective lens and producing a third digital image of the light captured by the third digital night vision sensor, wherein the third digital image is horizontally partially overlapping with the second digital image.

3. The night vision system of claim 2, wherein the processor further receives the third digital image from the third digital night vision sensor and combines the third digital image with the first and second digital images to form the wide-field image.

4. The night vision system of claim 1, wherein the first digital night vision sensor includes a horizontal resolution of at least 1600 pixels.

5. The night vision system of claim 1, wherein the first digital night vision sensor captures at least 27.5 degrees of a horizontal field of view of the user.

6. The night vision system of claim 1, wherein the first digital night vision sensor captures at least 30 degrees of a vertical field of view of the user.

7. The night vision system of claim 1, wherein the processor modifies the wide-field digital image to include information that was not originally present in the first or second digital images.

8. The night vision system of claim 7, wherein the information is overlaid on the wide-field digital image and the information includes at least one of: text, video, or geo-location information.

9. The night vision system of claim 1, wherein the first objective lens, first digital night vision sensor, second objective lens, second digital night vision sensor, display, and eyepiece are mounted to a helmet worn by the user.

10. The night vision system of claim 9, wherein the processor is not mounted to the helmet.

11. The night vision system of claim 1, wherein the night vision system is not helmet-mounted.

12. The night vision system of claim 11, wherein the night vision system is a part of a binocular or a telescope system.

13. The night vision system of claim 1, wherein the wide-field digital image is an image of a corresponding region of the environment and the wide-field digital image occupies a same position within a field of view of the user as the corresponding region of the environment.

14. The night vision system of claim 1, further comprising:
a third objective lens and a third digital night vision sensor, the third objective lens imaging light from the environment onto the third digital night vision sensor, the third digital night vision sensor capturing said light imaged by the third objective lens and producing a third digital image of the light captured by the third digital night vision sensor;

a fourth objective lens and a fourth digital night vision sensor, the fourth objective lens imaging light from the environment onto the fourth digital night vision sensor, the fourth digital night vision sensor capturing said light imaged by the fourth objective lens and producing a fourth digital image of the light captured by the fourth digital night vision sensor, wherein the fourth digital image and the third digital image are horizontally partially overlapping, wherein the processor receives the third and fourth digital images from the third and fourth digital night vision sensors and combines the third and fourth digital images to form a second wide-field digital image, and wherein the wide-field digital image and the second wide-field digital image horizontally overlap by at least 27.5 degrees; and a second display and a second eyepiece, the second display receiving the second wide-field digital image from the processor and displaying the second wide-field image, the second eyepiece imaging the second wide-field digital image into a second eye of the user.

15. The night vision system of claim 1, wherein the night vision system is head-mounted and further comprises:
an adjustable arm holding the display and eyepiece, the adjustable arm moveable to (a) a first position where the eyepiece is out of a line of sight of the eye of the user so that the wide-field digital image is not viewable by the eye of the user, and (b) a second position where the eyepiece is in the line of sight of the eye of the user so that the wide-field digital image is viewable by the eye of the user.

16. The night vision system of claim 1, wherein the display comprises pixels each having at least two subpixels, and each pixel of the wide-field digital image is displayed on a subpixel of the display.

17. The night vision system of claim 1, wherein the eyepiece includes an anamorphic eyepiece that changes an aspect ratio of the wide-field digital image as imaged into the eye of the user relative to the wide-field digital image as displayed by the display.

18. The night vision system of claim 1, wherein the light from the environment is night-time ambient light.

19. The night vision system of claim 1, wherein the digital night vision sensors capture light with a wavelength between 390 nanometers to 1100 nanometers in length.

* * * * *